United States Patent [19]

Takagi et al.

[11] Patent Number: 4,989,626

[45] Date of Patent: Feb. 5, 1991

[54] APPARATUS FOR AND METHOD OF CONTROLLING THE OPENING AND CLOSING OF CHANNEL FOR LIQUID

[75] Inventors: Yusuke Takagi; Yoshio Kojima, both of Hitachi; Kenji Mitani, Yokohama, all of Japan

[73] Assignee: Hitachi, Ltd., Tokyo, Japan

[21] Appl. No.: 433,330

[22] Filed: Nov. 8, 1989

[30] Foreign Application Priority Data

Nov. 11, 1988 [JP] Japan .................................. 63-283890

[51] Int. Cl.$^5$ ............................ F25B 2/02; F15C 1/04
[52] U.S. Cl. ..................................... 137/13; 137/341; 137/828; 62/3.3; 62/3.7
[58] Field of Search ............................ 62/3.2, 3.3, 3.7; 137/828, 334, 340, 341, 13

[56] References Cited

U.S. PATENT DOCUMENTS

| | | | |
|---|---|---|---|
| 2,942,615 | 6/1960 | Dayton | 137/334 |
| 3,256,697 | 6/1966 | Henderson | 62/3.7 |
| 3,452,767 | 7/1969 | Posingies | 137/828 |
| 3,528,449 | 9/1970 | Witte et al. | 137/334 |
| 3,677,275 | 7/1972 | Lovelock | 137/828 |
| 3,721,255 | 3/1973 | Suzuki et al. | 137/828 |
| 3,732,883 | 5/1973 | Munch | 137/828 |
| 3,779,814 | 12/1973 | Miles et al. | 62/3.7 |
| 4,066,365 | 1/1978 | Staunton | 62/3.2 |
| 4,476,685 | 10/1984 | Aid | 62/3.3 |

Primary Examiner—A. Michael Chambers
Attorney, Agent, or Firm—Antonelli, Terry, Stout & Kraus

[57] ABSTRACT

An apparatus for controlling the opening and closing of a channel for a liquid is arranged such that a liquid channel is closed by causing a controller to control one heat absorbing and generating part of a cooling/heating element to execute heat absorption and cooling a heat transmitting element to solidify the liquid in the channel. The apparatus is also arrangement such that the channel is opened first by causing the controller to control the same heat absorbing and generating part to execute heat generation and heating the heat transmitting element to melt the liquid solidified in the channel. A method of controlling the opening and closing of a channel according to the invention includes the steps of: solidifying a liquid in a channel by cooling it from the outside to close the channel; and opening the channel thus closed by melting the liquid solidified in the channel by the application of heat.

45 Claims, 12 Drawing Sheets

FIG.1A
FIG.1B
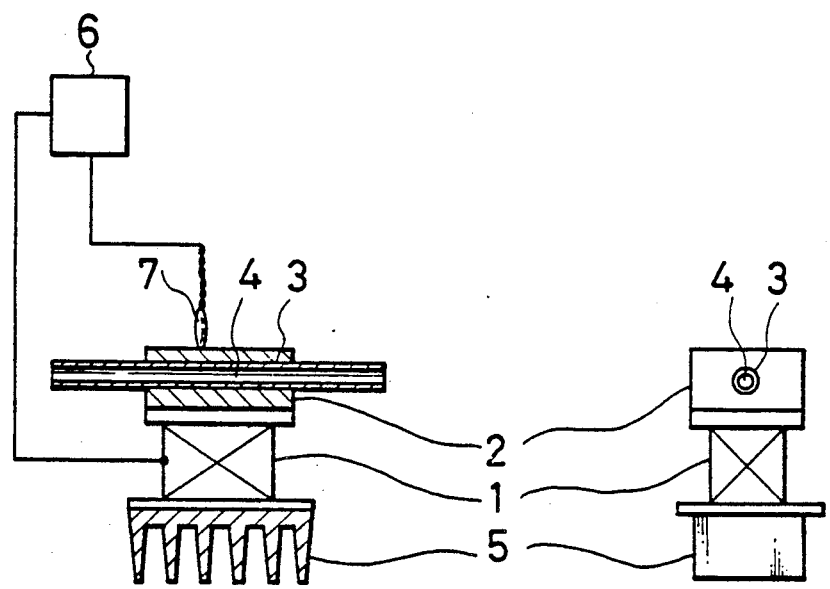
FIG.2
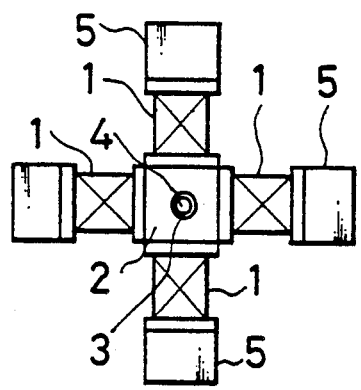

FIG. 5A
FIG. 5B
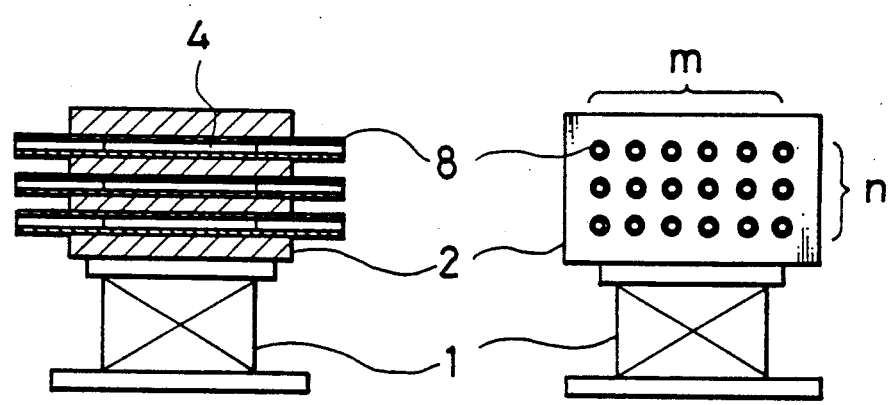
FIG. 6A
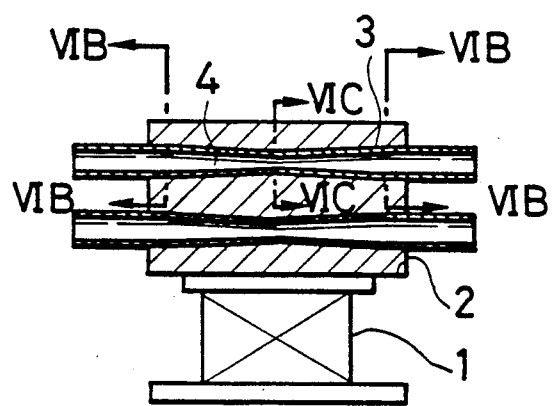
FIG. 6B
FIG. 6C

FIG.17A
FIG.17B
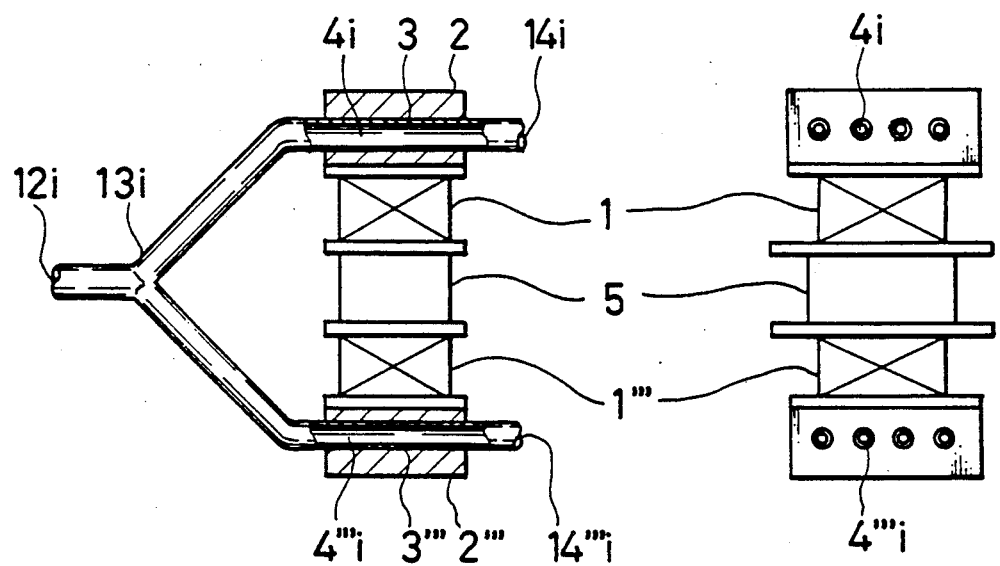
FIG.18
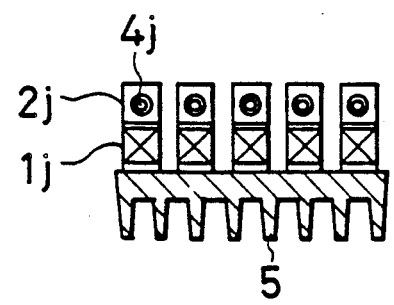

APPARATUS FOR AND METHOD OF CONTROLLING THE OPENING AND CLOSING OF CHANNEL FOR LIQUID

BACKGROUND OF THE INVENTION

1. Field of the Invention

The present invention relates generally to an apparatus for controlling the opening and closing of a channel for a liquid and, more particularly, to an apparatus for controlling the opening and closing of a channel for a liquid such as a solution which contains a vital substance, the apparatus being arranged to close the channel by solidifying the liquid itself in the channel and to open the channel by melting the solidified liquid. The invention also relates to a method of controlling the opening and closing of such a liquid channel.

2. Description of the Related Art

In a conventional type of system for effecting automatic analysis or separation of a sample of a vital substance such as blood, protein or the like, it is customary that a solenoid valve is employed to control the opening and closing of a channel for a liquid such as a sample solution, as disclosed in, for example, Japanese Patent Publication No. 5699/1988. This is because, as is well known, solenoid valves can be easily incorporated into an automated system since they are capable of electrically controlling the opening and closing of a channel for a liquid.

However, if such a solenoid valve is applied to control of the opening and closing of a channel for a liquid such as a sample solution containing a vital substance, the following problems arise.

(1) Since the internal liquid channel of the solenoid valve includes bends, abrupt increases and decreases in diameter and uneven portions in structural terms, samples are easily fixed to the inner surface of the liquid channel.

(2) Since a valve disc is forced against a valve seat, vital samples are easily impaired and, in addition, vibration or noise occurs.

In such a system, it is customary that, after the completion of separation or analysis of a first sample, if a second sample is to be handled, the channel is cleansed to prevent mixture or contamination of the sample. However, as described in paragraph (1), since the solenoid valve has a complicated internal structure, it is difficult to promptly remove all residual sample fixed to the inner surface and a long time are therefore required for cleansing. Moreover, as described in paragraph (2), in typical applications which require this kind of system, it is necessary that occurrence of vibration or noise be avoided as far as is possible.

SUMMARY OF THE INVENTION

It is, therefore, an object of the present invention to provide an apparatus for controlling the opening and closing of a channel for a liquid, which can solve the above-described problems experienced with solenoid valves and which is suitable for use in either a system for effecting separation or analysis of a sample of a vital substance such as blood, protein or the like or a system which does not suit a valve device utilizing mechanical operation.

It is another object of the present invention to provide a method of controlling the opening and closing of a channel for a liquid, whiCh can solve the above-described problems experienced with solenoid valves.

If the cause of the above problems involved in the prior arts is examined, it will be understood that, in any case, these problems are derived from the operation of controlling the opening and closing of a liquid channel by using a mechanical moving element.

Accordingly, to achieve the above objects, in accordance with one aspect of the present invention, there is provided an apparatus for controlling the opening and closing of a channel for a liquid, which apparatus includes heat transmitting means of a good heat conductivity type which is provided with at least one channel for a liquid, at least one cooling and heating means having one heat absorbing and generating part secured to the heat transmitting means, heat exchanger means secured to the other heat absorbing and generating part of the heat transmitting means, and controlling means for controlling the heat absorbing and generating part of the cooling and heating means to execute heat absorption or heat generation. The apparatus is arranged such that the channel is closed first by causing the controlling means to control the heat absorbing and generating part of the cooling and heating means which is closer to the heat transmitting means to execute the heat absorption and then by cooling the heat transmitting means to solidify the liquid in the channel in the heat transmitting means, and such that the channel is opened first by causing the controlling means to control the same heat absorbing and generating part to execute the heat generation and then by heating the heat transmitting means to melt the liquid solidified in the channel in the heat transmitting means.

In accordance with another aspect of the present invention, there is provided a method of controlling the opening and closing of a channel, which method includes the step of solidifying a liquid in the channel by cooling it from the outside to close the channel and the step of opening the channel thus closed by melting the liquid solidified in the channel by the application of heat.

In the apparatus for controlling the opening and closing of a channel, which is arranged in the above-described manner, the effect of heat absorption created by the cooling/heating means is transmitted to at least one channel for a liquid within the heat transmitting means to solidify the liquid such as a solution positioned in the channel, thereby closing the channel by the action of the solidified liquid to block the liquid flow. On the other hand, the heat generated by the cooling/heating means is transmitted to such channel to melt the solidified liquid, thereby opening the channel. In this manner, the operation of opening and closing the channel is realized.

As is apparent from the foregoing, the apparatus for controlling the opening and closing of a channel for a liquid such as a solution in accordance with the present invention effects opening and closing of the channel by utilizing the phase change of the liquid between solid phase and liquid phase within the channel instead of mechanical moving parts which have otherwise been required. The present invention therefore provides the advantages that the configuration of the channel for a liquid can be made simple and that no mechanical moving part is required as an opening and closing mechanism. Accordingly, it is possible to provide an apparatus and a method which are most suitable for separation and analysis of samples such as vital substances.

BRIEF DESCRIPTION OF THE DRAWINGS

FIGS. 1A and 1B are a partially vertical sectional view and a front elevational view, respectively, which serve to illustrate a first embodiment of an apparatus for controlling the opening and closing of a channel according to the present invention;

FIG. 2 is a front elevational view showing a second embodiment of the present invention;

FIGS. 5A and 5B are a partially vertical sectional view and a front elevational view, respectively, which serve to illustrate a fifth embodiment of the present invention;

FIG. 6A is a partially vertical sectional view showing a sixth embodiment of the present invention;

FIG. 6B and 6C show a partial cross-sectional shape and a cross-sectional view of a channel, respectively;

FIGS. 17A and 17B are a partially vertical sectional view and a front elevational view, respectively, which show a seventeenth embodiment of the present invention;

FIG. 18 is a front elevational view showing an eighteenth embodiment of the present invention;

Figure 3:
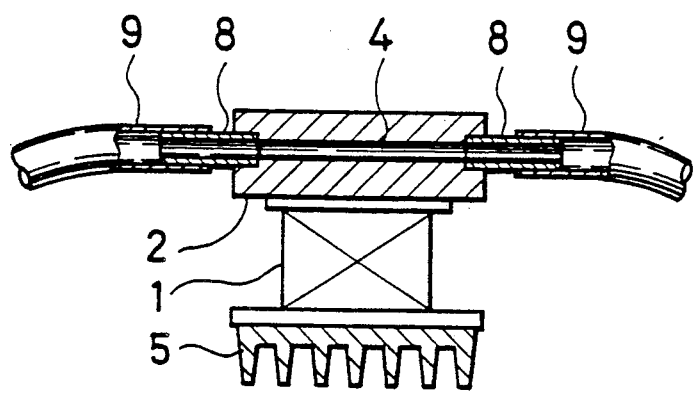
FIG. 3 is a partially vertical sectional view showing a third embodiment of the present invention.

DESCRIPTION OF THE PREFERRED EMBODIMENTS:

The present invention will be explained in detail below with reference to embodiments which are diagrammatically shown in the accompanying drawings. In the explanation of each of the illustrated embodiments, the same reference numerals are used to denote the same functional elements, and it is not intended to limit the present invention to any specific embodiment.

A first embodiment of an apparatus for controlling the opening and closing of a channel according to the present invention includes a cooling/heating means 1 which is made from a thermoelement and which has the function of electrically cooling and heating an object, and a heat transmitting means 2 secured to one side (the heat absorbing side) of the cooling/heating means 1. The heat transmitting means 2 is made of a material having good heat conductivity, for example, copper, aluminum, an alloy of either of them or ceramics such as HITACERAM SC-101. A tubular channel 4 extends through the heat transmitting means 2. The tubular channel 4 is formed from a channel forming member 3 made of metal, ceramics, synthetic resin or the like. The diameter of this channel 4 is 0.1 mm to 10 mm or thereabouts. A fin-type heat exchanger means 5 for removing the heat generated or absorbed by the heating/cooling means 1 is secured to the other end (heat generating side) of the cooling/heating means 1. Control of the cooling and heating operations of the cooling/heating means 1 is electrically executed by a controlling means 6 which will be explained in detail in connection with FIG. 21. In the first embodiment, a temperature sensor 7 made from a thermocouple is used to monitor the temperature of the heat transmitting means 2, thereby controlling the temperature of the channel 4 to be heated or cooled.

In the apparatus for controlling the opening and closing of a channel for a liquid in accordance with the present invention having the above-described arrangement and construction, control of the opening and closing of the channel is performed in the following manner. First of all, an explanation is given of closing the channel. The thermoelement or Peltier element (thermoelectric module) which is used as the cooling/heating means 1 makes use of the Peltier effect by which heat absorption or heat generation is caused, due to the application of a direct current, at a portion where semiconductors are secured to each other. In this case, the respective amounts of heat absorbed and generated depend on the magnitude of the applied current and exhibit the characteristics of the directions of heat absorption and heat generation being reversed by the conversion of the polarity of the applied current. For this reason, in the apparatus shown in FIG. 1, the controlling means 6 provides control so that the upper one of the mutually secured semiconductors which constitute the cooling/heating means 1 serves as a heat absorbing element. Accordingly, the heat transmitting means 2, which is secured to the upper end of the cooling/heating means 1, is cooled and the cooling effect is transmitted to the channel forming member 3, thereby cooling the liquid in the channel 4. In this manner, the temperature of the liquid in the channel 4, for example, the temperature of a solution, gradually falls, until the portion of the solution which has reached its solidifying temperature starts to solidify. Finally, the whole of the solution in the channel 4 solidifies to close the channel 4. If the controlling means 6 detects a frozen state by means of the temperature sensor 7, then the controlling means 6 adjusts the value of the applied current and provides control to maintain the temperature of the frozen portion at a fixed temperature which is lower than the solidifying temperature, thereby maintaining the solidified state. In this manner, the liquid thus solidified dams the channel to close the channel. In this case, the channel is closed within the pressure range over which the pressure of liquid flow does not exceed the fixing strength with which the solidified liquid is fixed to the inner wall surface of the channel. In the process of closing the channel, although the lower part of the cooling/heating means 1 generates heat, the fin-type heat exchanger means 5 dissipates the generated heat to enhance the effect of cooling the heat transmitting means 2, hence the channel 4.

The following is an explanation of opening the channel 4 which has been closed by a solidified solution. The controlling means 6 sets the polarity of the direct current applied to the cooling/heating means to the polarity reverse to the one which is held during cooling. This setting causes the side of the cooling/heating means 1 which is nearer to the heat transmitting means 2 to generate heat. Accordingly, the heat transmitting mean 2 is heated and the heat thus applied is transmitted to the channel forming member 3, thereby gradually raising the temperature of the solution solidified in the channel 4. When the temperature of the solution solidified in the channel 4 reaches its melting temperature, then melting starts, but the controlling means 6 uses the temperature sensor 7 to continue control of heating until the solution solidified in the channel 4 is completely molten. In this manner, the interior of the channel 4 is again filled with the molten solution alone, thereby effecting the opening of the channel 4. Incidentally, in the process of heating, since the lower end portion of the cooling/heating means 1 is cooled, heat absorption is effected by the heat exchanger means 5.

As is apparent from the foregoing, in accordance with the present invention, the opening and closing of the channel is performed completely electrically and automatically without mechanical operation. The configuration of the inner surface of the channel 4 is extremely simple compared to that of a typical solenoid valve. As is well known, it is common practice to preserve a sample solution such as a vital substance or the like in the frozen state. Accordingly, even if the channel is closed by solidifying the solution, this solidification has little effect on the state of the vital substance. As is evident from the foregoing, the first embodiment provides the following advantages.

(1) Since no mechanical moving part is used, the opening and closing of the channel causes no serious detriment to the vital substance and, in addition, neither vibration nor noise is generated.

(2) Since the configuration of the inner surface of the channel is extremely simple, no vital substance severely sticks to the inner surface of the channel and cleansing is therefore facilitated.

It is to be noted that ceramics having electrical insulation characteristics and good heat conductivity, for example, a sintered compact of silicon carbide (HITACERAM SC-101), may be used for the channel forming member. In this case, the above-described embodiment of the apparatus for controlling the opening and closing of the channel can be electrically insulated from the solution. Accordingly, such ceramics are suitable for use in applications that require electrical insulation between the apparatus and the solution.

In a second embodiment of the apparatus for controlling the opening and closing of a channel in accordance with the present invention as shown in FIG. 2, a plurality of cooling/heating means 1 are provided around the heat transmitting means 2 through which the channel 4 extends. One end of each of the cooling/heating means 1 is secured to a respective side of the heat transmitting means 2, while the other end is provided with the heat exchanger means 5. In the second embodiment, the amount of heat absorbed and that of heat generated tend to increase compared to the arrangement of the type using a single cooling/heating means. Accordingly, the rates of solidification and melting of the solution in the channel increase, whereby the response time of the opening and closing of the channel is improved.

In a third embodiment of the apparatus for controlling the opening and closing of a channel in accordance with the present invention as shown in FIG. 3, the tubular channel 4 is formed as a bore which extends through the heat transmitting means 2 itself which is made of a material having good heat conductivity, for example, copper, aluminum, or an alloy of either of them. In the third embodiment, pipes 8 are connected to the respective ends of the channel 4 formed in the heat transmitting means 2. Tubes 9 are made of synthetic resin having relatively low heat conductivity, such as PTFE, silicon or the like, and are fitted onto the outer peripheries of the respective pipes 8, thereby forming a single channel. Accordingly, the third embodiment provides the advantage of efficiently effecting cooling and heating of the solution in the channel 4 in that the aforementioned channel forming member is omitted and in that the channel 4 is effectively thermally insulated from the exterior. Incidentally, a specific kind of sample may chemically react on, or may not biologically match, metal which is used for the heat transmitting means. For this reason, it is preferable that the inner surface of the channel 4 be covered with a thin-film coat of gold or resin such as PTEF or the like.

Figure 4:
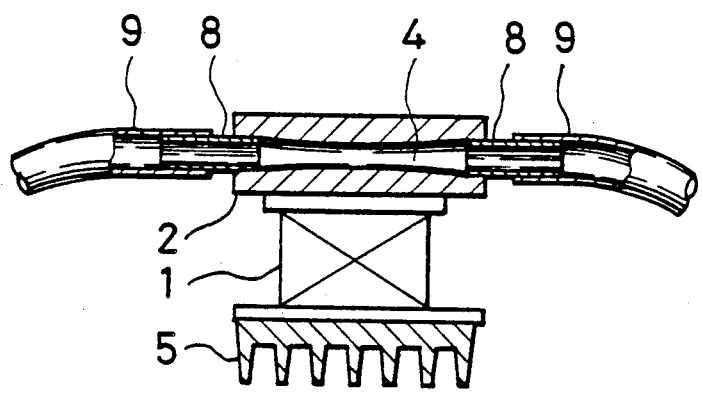
FIG. 4 is a partially vertical sectional view showing a fourth embodiment of the present invention.

In a fourth embodiment of the apparatus for controlling the opening and closing of a channel in accordance with the present invention as shown in FIG. 4, the tubular channel 4 which is also used in the embodiment of FIG. 3 is defined by two tapers each of which is, as illustrated, gradually diverged toward the outside. The cross-sectional area of the channel 4 is made gradually smaller from each outward port A and B toward a middle part C. In this case, not only the fixing strength with which a solidified liquid is fixed to the inner wall surface of the channel but also the resistance of a frozen solution against compression and deformation applied thereto serve as forces acting to close the channel, that is, forces which resist the pressure of liquid flow. For this reason, as compared to the arrangement of FIG. 3 in which the cross-sectional area of the channel is fixed throughout the length, the fourth embodiment makes it possible to more reliably close the channel. In addition, since the cross-sectional area of the middle part of the channel is minimized, it is possible to block the flow in either direction. Moreover, even in the case of a solution of the kind which involves cubical expansion during solidification, an expanded portion can be made to escape along either of the tapers toward the outside. Accordingly, it is also possible to provide the advantage of preventing breakage of the channel.

Incidentally, if the direction of solution flow is fixed, the channel may be formed into a configuration which gradually diminishes in cross-sectional area in the direction of solution flow.

As a fifth embodiment of the present invention, FIGS. 5A and 5B show an apparatus for controlling the opening and closing of a plurality of channels. The heat transmitting means 2 has a plurality of channels 4 which are arranged in m horizontal rows and n vertical columns and which extend in the same direction. Accordingly, the fifth embodiment provides the advantage that the opening and closing of a multiplicity of channels can be controlled at the same time.

As a sixth embodiment of the present invention, FIGS. 6A, 6B and 6C show another arrangement in which the cross-sectional area of the middle part of the channel 4 is minimized. In the sixth embodiment, each channel forming member 3 is produced from a thin-walled narrow tube of stainless steel, copper or the like or a flexible resin tube, and the channel forming members 3 thus prepared are inserted through individual bores formed in the heat transmitting means 2. The respective bores of the heat transmitting means 2 have circular configurations in cross section at opposite outward portions as shown in FIG. 6B, while the middle parts of them are, as shown in FIG. 6C, formed into an oval configuration which has the same circumferential length. Accordingly, the cross-sectional area of each of the bores reaches a minimum at the middle. With the sixth embodiment, it is possible to accomplish, in addition to a high blocking force which is equivalent to that achieved in the embodiment of FIG. 4, the advantage that, since each of the entire channels including the channel 4 can be made from a single seamless pipe or tube, the production is facilitated.

Incidentally, if the portions at which the channel forming members 3 are in contact with the corresponding bores in the heat transmitting means 2 are charged with an adhesive such as heat epoxy resin or the like, it is possible to prevent offsetting of these elements and a decrease in the heat resistance between them.

Figure 7A:
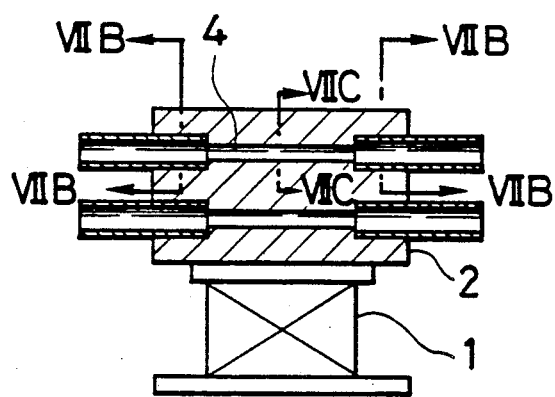
FIG. 7A is a partially vertical sectional view showing a seventh embodiment of the present invention.
Figure 7B:
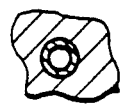
FIG. 7B is a cross-sectional view taken along line VII B—VII B of FIG. 7A.
Figure 7C:
FIG. 7C is a cross-sectional view taken along line VII C—VVI C of FIG. 7A.

As a seventh embodiment of the present invention, FIGS. 7A, 7B and 7C show yet another arrangement in which the middle cross-sectional area of each of the channels 4 is minimized. In the seventh embodiment, the middle parts of the respective channels 4 are defined by constant-diameter bores formed in the heat transmitting means 2, and tubular pieces 8 are fitted into the opposite end portions of each bore 8. As can be seen from FIG. 7C, since the inner diameter of each bore is made smaller than that of each corresponding end portion, the cross-sectional area of the middle part of the channel 4 is at the minimum. With the seventh embodiment, it is possible to accomplish, in addition to a high blocking force which is equivalent to that achieved in the fourth embodiment, the advantage that, since the tubular pieces are merely fitted into the opposite end parts of the individual bores, the production is facilitated.

Figure 8:
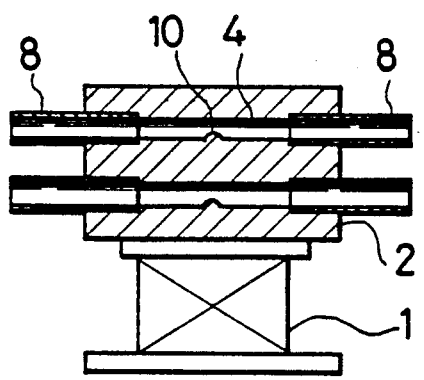
FIG. 8 is a partially vertical sectional view showing an eighth embodiment of the present invention.

As an eighth embodiment of the present invention, FIG. 8 show yet another arrangement in which the middle cross-sectional area of each of the channels 4 is minimized. In the eighth embodiment, each channel 4 is defined by a bore formed in the heat transmitting means 2 itself, and a projection 10 is formed on the inner surface of the channel 4 in the middle thereof. With the eighth embodiment, it is possible to provide the advantage that, since the tubular pieces are merely fitted into the opposite end parts of the individual bores, the production is facilitated.

Figure 9:
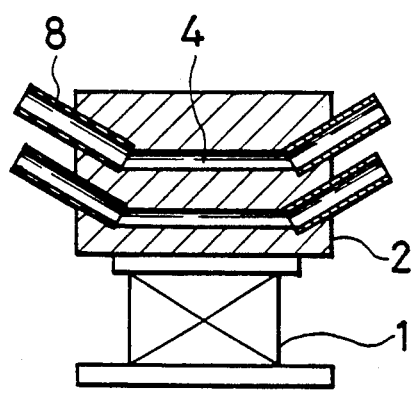
FIG. 9 is a partially vertical sectional view showing a ninth embodiment of the present invention.

As a ninth embodiment of the present invention, FIG. 9 shows an arrangement in which each channel 4 is bent in the direction of flow. In the ninth embodiment, the tubular pieces 8 are fitted into the opposite end parts of the individual channels 4 in such a manner that each tubular piece 8 makes a fixed angle with the corresponding middle channel defined by a bore which is formed in the heat transmitting means 2 itself. In this embodiment, the blocking force produced in each channel 4 is formed from not only the fixing strength with which the frozen portion of a solution is fixed to the inner wall surface of the channel 4 but also the resistances of respective bends against the shearing forces caused by the freezing of the solution. Accordingly, the ninth embodiment provides the advantage that it is possible to more reliably close the channels.

Figure 10:
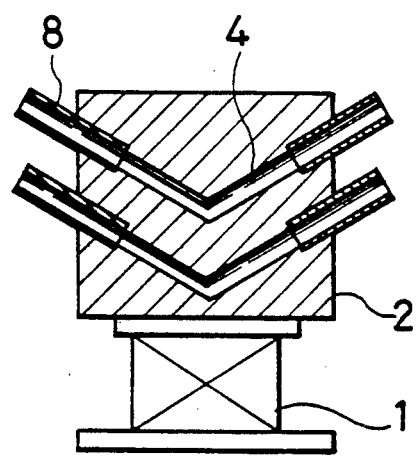
FIG. 10 is a partially vertical sectional view showing a tenth embodiment of the present invention.

As a tenth embodiment of the present invention, FIG. 10 shows another arrangement which is based on the same concept as that of the ninth embodiment. The channels 4 are defined by individual bores formed in the heat transmitting means 2 itself in such a manner that each channel 4 is bent at the middle in V-like form. The tubular pieces 8, which have the same inner diameters as the channels 4, are fitted into the opposite ends of the individual channels 4. With the tenth embodiment, it is possible to accomplish, in addition to a high blocking force which is equivalent to that achieved in the ninth embodiment, the advantage that, since a single bent is provided for each channel, the production is facilitated.

In each of the ninth and tenth embodiments shown in FIGS. 9 and 10, the distance between the cooling/heating means 1 and the middle of each channel 4 becomes the smallest. Accordingly, the solidification of the solution in the channels 4 starts at the middle at an earlier time, whereby it is possible to effect closure of the channels 4 at an earlier time. Moreover, since the expanded portion of the solution which results from cubical expansion during the solidification escapes outside of the channels 4, it is possible to prevent breakage of the channels 4.

Figure 11:
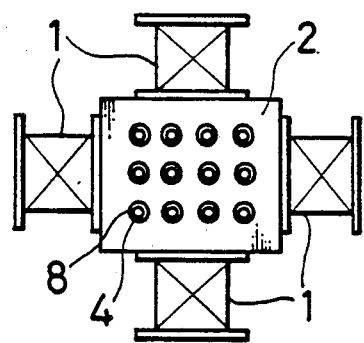
FIG. 11 is a front elevational view of an eleventh embodiment of the present invention.

As an eleventh embodiment of the present invention, FIG. 11 shows an arrangement for controlling the opening and closing of a plurality of channels at the same time by using a plurality of cooling/heating means. In the eleventh embodiment, a plurality of cooling/heating means 1 are connected to the respective sides of the heat transmitting means 2 which have a plurality of channels 4. The eleventh embodiment provides the advantage that the response time of the opening and closing of the channel can be improved.

Figure 12:
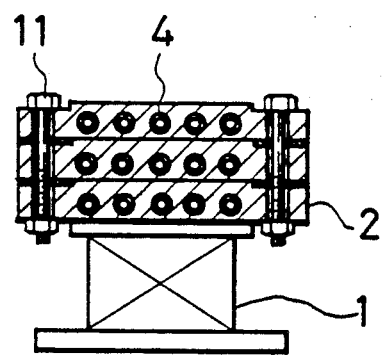
FIG. 12 is a partially vertical sectional view showing a twelfth embodiment of the present invention.

As a twelfth embodiment of the present invention, FIG. 12 shows a structure which makes it possible to easily change the number of channels which are opened and closed at the same time. FIG. 12 illustratively shows an arrangement in which a plurality of heat transmitting means 2 each having a plurality of channels 4 formed as bores are stacked and fastened by bolts 11.

Figure 13A:
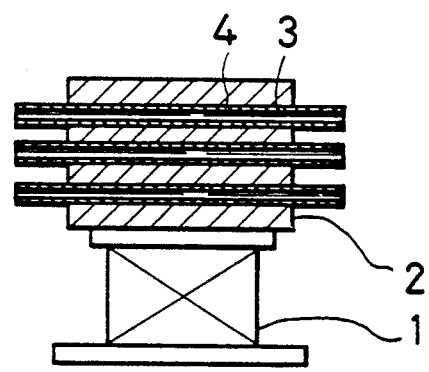
FIGS. 13A and 13B are a partially vertical sectional view and a partially cross-sectional front elevational view, respectively, which serve to illustrate a thirteenth embodiment of the present invention.
Figure 13B:
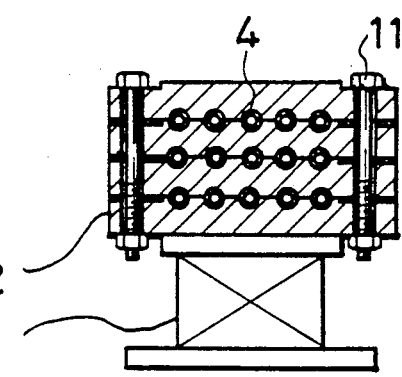

In the thirteenth embodiment shown in FIGS. 13A and 13B, a plurality of channels 4 formed from the channel forming members 3 are arranged in rows, and each row is sandwiched between the heat transmitting means 2 each having concave recesses at positions corresponding to the respective channels 4. These assemblies are stacked in a plurality of stages and fastened by the bolts 11.

Either of the twelfth and thirteenth embodiments has the advantage that the number of channels which are to be opened and closed at the same time can be easily altered. Moreover, in the thirteenth embodiment, the depth of the middle of each concave recess formed in the heat transmitting means 2 is made small so that the cross-sectional area of the middle of each channel 4 is reduced. Accordingly, a high blocking force can be yielded.

Figure 14A:
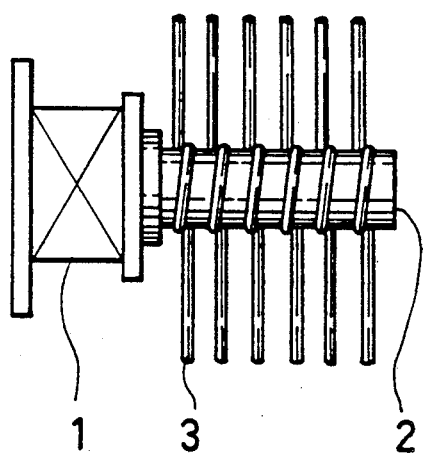
FIGS. 14A and 14B are a front elevational view and a plan view showing a fourteenth embodiment of the present invention.
Figure 14B:
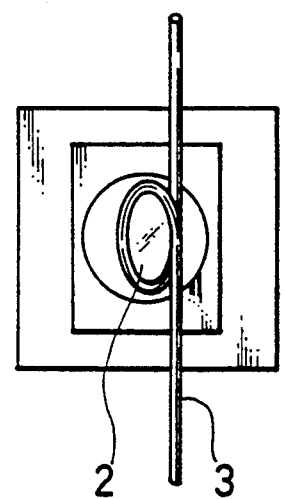

In the fourteenth embodiment shown in FIG. 14A and 14B, a flexible metallic tube or resin tube is employed for the channel forming member 3, and a set of channel forming members 3 are wound around the outer periphery of the heat transmitting means 2 having an oval configuration in cross section. Since the curvature of each channel varies in the direction of flow, not only the fixing strength with which a frozen part of a solution is fixed to the inner wall surface of the channel but also resistances against shearing deformation act as forces which close the channels. Accordingly, a high blocking force can be yielded and the advantage that the production is extremely easy is also enjoyed.

Figure 15:
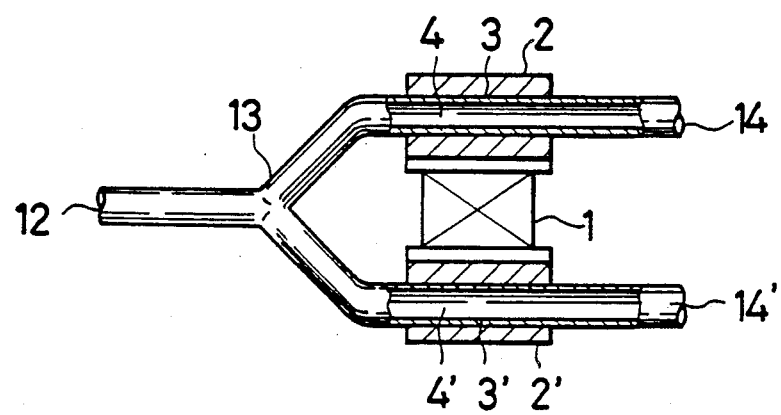
FIG. 15 is a partially vertical sectional view showing a fifteenth embodiment of the present invention.
Figure 16:
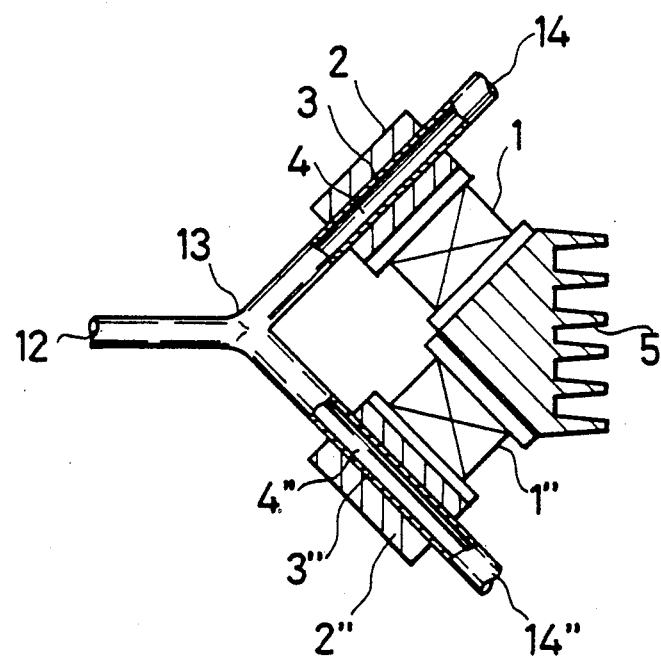
FIG. 16 is a partially vertical sectional view showing a sixteenth embodiment of the present invention.

Fifteenth, sixteenth and seventh embodiments, which are shown in FIGS. 15, 16 and 17, respectively, are constructed as control apparatus for channels.

In the fifteenth embodiment, a main channel 12 is separated into branch channels 14 and 14' at a branch point 13. Heat transmitting means 2 and 2' are respectively secured to the upper and lower end faces of a single cooling/heating means 1, and channels 4 and 4' are formed in the heat transmitting means 2 and 2', respectively. The branch channels 14 and 14' are connected to the respective channels 4 and 4'. When the cooling/heating means 1 is nonoperative, the branch channels 14 and 14' are both open. In this state, when the cooling/heating means 1 is energized by controlling means (not shown), the solution in the channel 4 which is located on a heat-absorbing side solidifies and closes the corresponding channel, while the other channel 4' remains open. In contract, if the polarity of the direct current applied to the cooling/heating means 1 is reversed, the channel 4 is made open, while the solution in the channel 4' solidifies and closes the channel 4'. Accordingly, the fifteenth embodiment has the advantage that the channels can be switched by reversing the polarity of the applied current.

As the sixteenth embodiment, FIG. 16 shows one example of switching control apparatus. The sixteenth embodiment differs from the fifteenth embodiment in that the channels 4 and 4'' connected to the respective branch channels 14 and 14'' are provided with independent cooling/heating means 1 and 1'' and in that the heat generating sides of the cooling/heating means 1 and 1' are secured to a common heat exchanger means 5. Accordingly, the sixteenth embodiment provides, in addition to a channel switching function similar to that achieved in the fifteenth embodiment, the following advantages: it is possible to close the two branch channels 14 and 14'' at the same time; and it is possible to prevent the semiconductor device from being damaged due to an excessive increase in the temperature on the heat-generating side.

As the seventeenth embodiment, FIGS. 17A and 17B show an example of a multi-channel switching apparatus which is applicable to the switching of a plurality of channels. The seventeenth embodiment differs from the sixteenth embodiment in the following points: a plurality of main channels $12i$ ($i=1-m$) are each separated into branch channels $14i$ and $14'''i$, and a plurality of channels $4i$ and $4'''i$ to be cooled and heated are formed in separate heat transmitting means 2 and $2'''$, respectively. That plurality of branch channels $14i$ and $14'''i$ is connected to the plurality of channels $4i$ and $4'''i$, respectively. In accordance with the seventeenth embodiment, it is possible to provide a multi-channel switching apparatus capable of switching a plurality of independent main channels each having branch channels at the same time.

As an eighteenth embodiment, FIG. 18 shows an apparatus for selectively opening and closing a plurality of channels. As illustrated, the eighteenth embodiment includes a plurality of relatively independent cooling/heating means $1j$ ($1j=1-m$), and a plurality of heat transmitting means $2j$ are secured to the heat-absorbing sides of the cooling/heating means $1j$, respectively. Each of the heat transmitting means $2j$ has a channel $4j$ in relatively independent relationship. The heat-generating sides are secured to a common heat exchanger means 5. Each of the cooling/heating means $1j$ is independently controlled by controlling means (not shown). Accordingly, the eighteenth embodiment provide the advantage that it is possible to selectively open and close a plurality of independent channels by means of a simple arrangement by selectively controlling the cooling/heating means $1j$.

Figure 19:
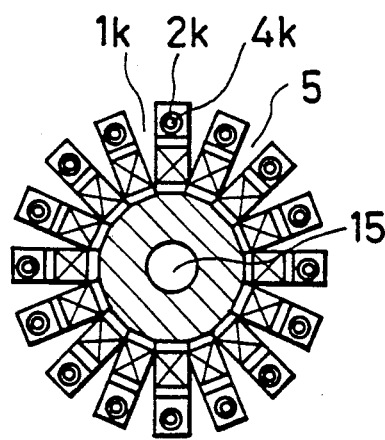
FIG. 19 is a front elevational view showing a nineteenth embodiment of the present invention.

FIG. 19 shows a nineteenth embodiment of the present invention. The primary difference between the nineteenth embodiment and the eighteenth embodiment resides in the fact that a plurality of relatively independent cooling/heating means $1k$ ($k=1-m$) are secured at their heat-generating sides to the outer periphery of the heat exchanger means 5 having a central conduit 15 in such a manner that the cooling/heating means $1k$ are arranged in radial form around the heat exchanger means 5. The conduit 15 consists of a heat pipe or a channel for a cooling liquid, and is used for removing the heat generated by the cooling/heating means $1k$. The nineteenth embodiment has the advantages that the apparatus can be structured with a compact construction and that it is possible to selectively open and close a multiplicity of channels in a manner similar that used in the eighteenth embodiment.

Figures 20A, 20B:
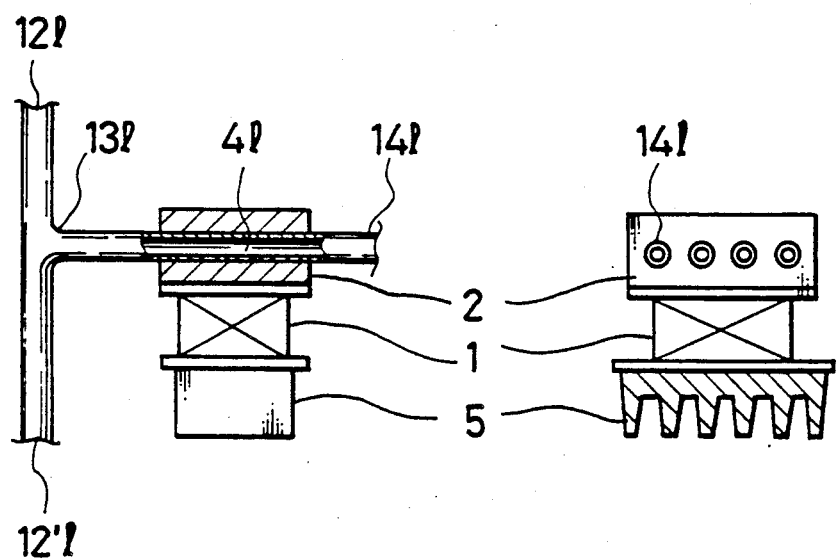
FIGS. 20A and 20B are a partially vertical sectional view and a front elevational view, respectively, which show a twentieth embodiment of the present invention.

As a twelfth embodiment of the present invention, FIGS. 20A and 20B show an arrangement which is suitable for use in cleansing a plurality of channels. In the figures, a plurality of main channels $12l-12'l$ ($l=1-m$) through which a sample solution flows and respective branch channels $14l$ are connected at corresponding branch portions $13l$, and the branch channels $14l$ serve to introduce a cleansing liquid into the main channels $12l-12'l$. These branch channels $14l$ form a plurality of channels $4l$ in the heat transmitting means 2 secured to the heat exchanger means 1. In operation, while a system connected to the main channels $12l-12'l$ is being performing separation or analysis, the channels $4l$ are frozen by the cooling/heating means 1, On the other hand, for cleansing, the channels $14l$ are opened by heating and a cleansing liquid is introduced through each branch channel $14l$ to cleanse the main channels $12l-12'l$. In accordance with the twelfth embodiment, since the cleansing of a plurality of channels can be realized with a compact construction, it is possible to reliably cleanse, for example, the sampling channels of an electrophoretic apparatus which includes up to several tens of main channels.

Although each of the above-described embodiments employs a thermoelement as the cooling/heating means, a heat pump may be substituted for the thermoelement.

Figure 21:
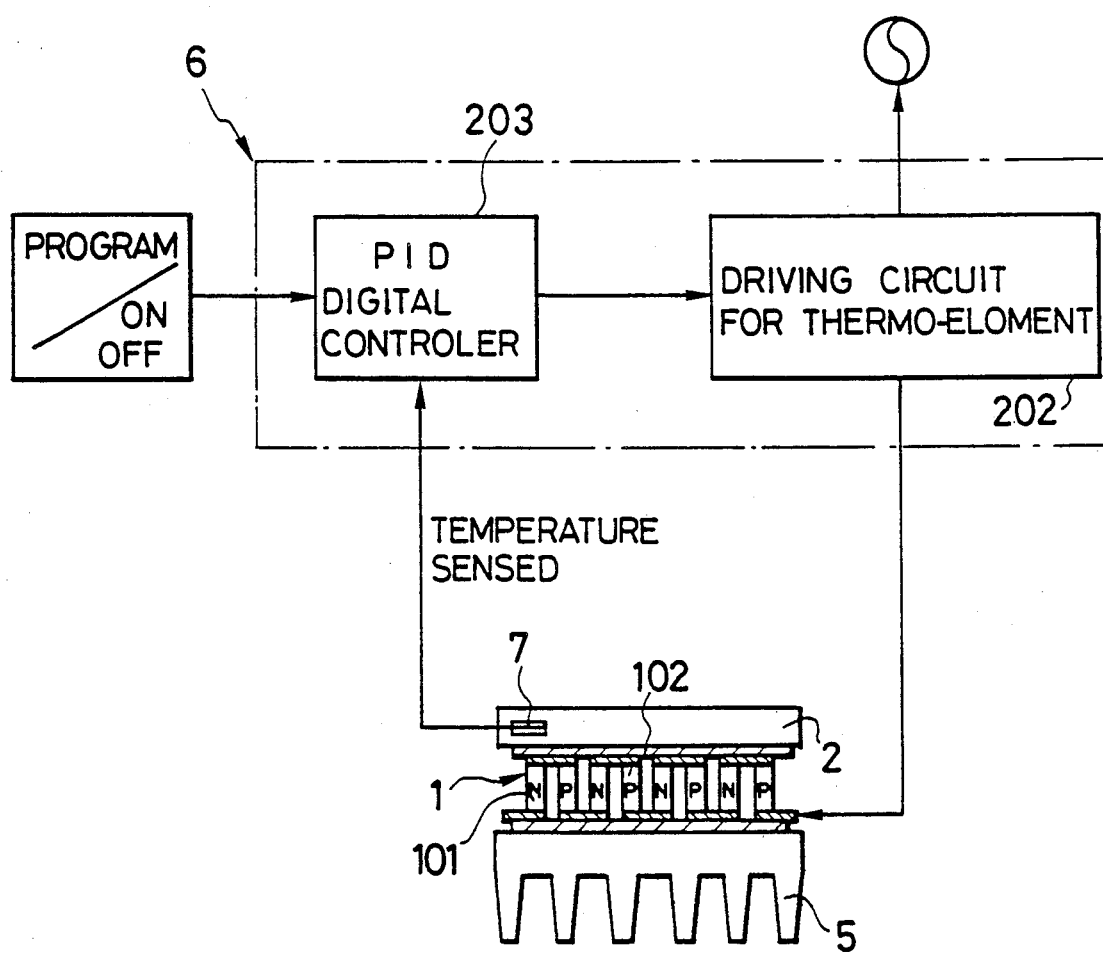
FIG. 21 is a block diagram showing controlling means for use in the invention.

FIG. 21 shows a thermoelement which serves as the cooling/heating means 1 for an apparatus for controlling the opening and closing of a liquid channel in accordance with the present invention. In the illustrated thermoelement, N-type semiconductors 101 and P-type semiconductors 102 are electrically connected in series, and each connecting point is connected to the heat transmitting means 2 and the heat exchanger means 5 in parallel and in alternate sequence. The thermoelement 1 is supplied with a direct current power from a thermoelement driving circuit 202 to cool or heat the heat transmitting means 2. The thermoelement driving circuit 202 is supplied with electrical power from an alternating current supply and this alternating current power is supplied to the thermoelement 1 by controlling the polarity and magnitude of the direct current power supplied to the thermoelement 1 on the basis of a control signal from a PID digital controller 203. The PID digital controller 203 provides voltage control over the voltage of the input electrical power in response to ON-OFF manual control or programmed control and an input indicating the temperature detected by a temperature sensor inserted in the heat transmitting means, and opens or closes the channel in the heat transmitting means as desired.

Figure 22:
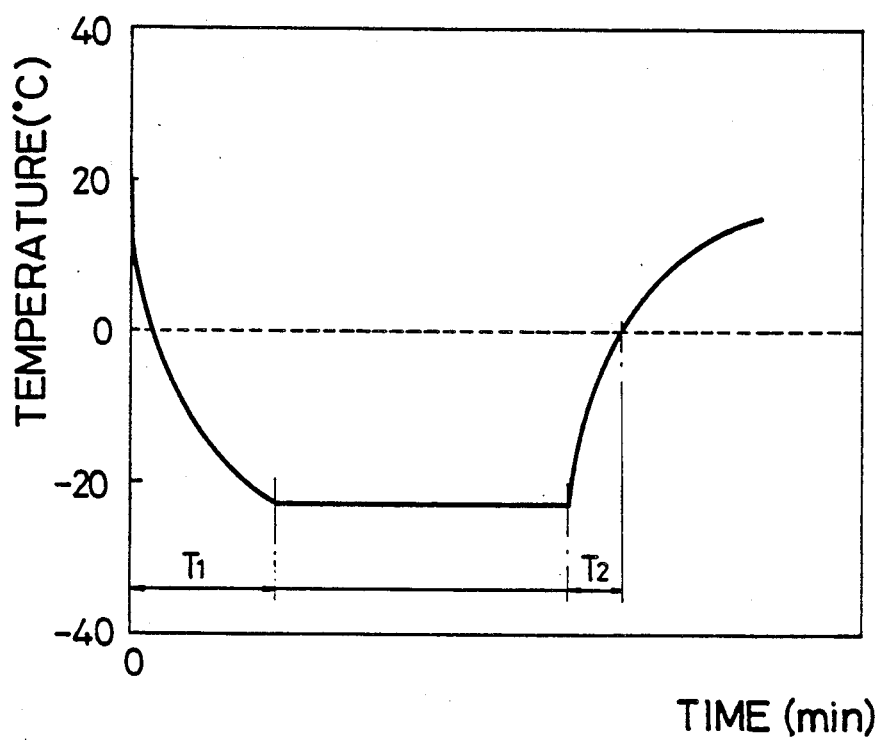
FIG. 22 is a graphic representation showing one example of the control characteristics of an apparatus for controlling the opening and closing of a channel according to the present invention.

FIG. 22 illustratively shows the opening and closing operation of the liquid channel. In FIG. 22, temperature is plotted along the vertical axis, while the horizontal axis represents time. The channel for a liquid which was to be cooled by a 27 W/h thermoelement had a diameter of 0.5 mm and the temperature of physiological salt solution flowing in the channel was set to 20° C. Under such conditions, the time T1 required to close the channel by cooling the heat transmitting means and solidifying the liquid in the channel was approximately 2 minutes, and the time T2 required to open the channel by reversing the polarity of an electrical power supply and melting the solidified liquid was approximately 25 seconds. In the same conditions, for the case of the diameter of the channel=1.0 mm, the time T1 was approximately 2 minutes with the time T2 approximately 35 seconds.

What is claimed is:

1. A method of controlling the opening and closing of a channel for a liquid, comprising the steps of:
    cooling said liquid in said channel from the outside of said channel to solidify said liquid, thereby closing said channel; and heating said channel from the outside thereof to melt said liquid solidified in said channel, thereby opening said channel.

2. A method of controlling the opening and closing of a channel for a liquid according to claim 1, further comprising initially causing said liquid to flow through said channel, initiating the cooling of said liquid in said channel when the flow of liquid is to be stopped thereby solidifying the liquid and then continuing the flow of liquid by heating the channel from the outside to melt the solidified liquid to initiate the flow of liquid within said channel.

3. An apparatus for controlling the opening and closing of a channel for a liquid, comprising:
    heat transmitting means of a good heat conductivity type through which at least one channel for a liquid extends;
    at least one cooling and heating means having one heat absorbing and generating part secured to said heat transmitting means;
    heat exchanger means secured to another part of said at least one cooling and heating means; and
    controlling means for controlling said heat absorbing and generating part of said cooling and heating means to execute heat absorption or heat generation;
    said apparatus being arranged such that said channel is closed first by causing said controlling means to control said heat absorbing and generating part of said cooling and heating means which is closer to said heat transmitting means to execute said heat absorption and then by cooling said heat transmitting means to solidify said liquid in said channels in said heat transmitting means, and such that said channel is opened first by causing said controlling means to control the same heat absorbing and generating part to execute said heat generation and then by heating said heat transmitting means to melt said liquid solidified in said channels in said heat transmitting means.

4. An apparatus for controlling the opening and closing of a channel for a liquid according to claim 3, wherein said heat transmitting means is made from a single member.

5. An apparatus for controlling the opening and closing of a channel for a liquid according to claim 3, wherein said heat transmitting means is made from a plurality of plate-shaped members in each of which a channel for said liquid is formed.

6. An apparatus for controlling the opening and closing of a channel for a liquid according to claim 3, wherein said heat transmitting means is made from a plurality of plate-shaped members which are secured to each other in a stacked manner, said channel for said liquid being made from a tube which is secured by recesses formed in adjoining flat portions of said respective plate-shaped members.

7. An apparatus for controlling the opening and closing of a channel for a liquid according to claim 3, wherein at least one part of said channel for said liquid in said heat transmitting means is defined by a bore formed in said heat transmitting means.

8. An apparatus for controlling the opening and closing of a channel for a liquid according to claim 7, wherein said channel for said liquid is made up of said bore formed in said heat transmitting means, tubular pieces securely fitted into respective opposite ends of said bore, and thermally insulating tubes connected to said respective tubular pieces.

9. An apparatus for controlling the opening and closing of a channel for a liquid according to claim 3, wherein said channel for said liquid in said heat transmitting means is curved.

10. An apparatus for controlling the opening and closing of a channel for a liquid according to claim 3, wherein said channel for said liquid in said heat transmitting means is bent at at least one part.

11. An apparatus for controlling the opening and closing of a channel for a liquid according to claim 3, wherein the cross section of said channel for said liquid in said heat transmitting means is partially reduced.

12. An apparatus for controlling opening and closing of a channel for a liquid according to claim 3, wherein said at least one channel in said heat transmitting means is made gradually narrower in the direction of fluid flow of said liquid to form a tapered shape.

13. An apparatus for controlling the opening and closing of a channel for a liquid according to claim 3, wherein said cooling and heating means is a heat pump.

14. An apparatus for controlling the opening and closing of a channel for a liquid according to claim 3, wherein said cooling and heating means is a thermoelement.

15. An apparatus for controlling the opening and closing of a channel for a liquid according to claim 14, wherein said thermoelement is made from a semiconductor device.

16. An apparatus for controlling the opening and closing of a channel for a liquid according to claim 15, wherein said semiconductor device includes N-type semiconductors and P-type semiconductors which are electrically connected in series and in alternate sequence, each connecting point of said semiconductor device being connected to said heat transmitting means and said heat exchanger means in parallel and in alternate sequence.

17. An apparatus for controlling the opening and closing of a channel for a liquid according to claim 16, wherein said N-type semiconductor is made from bismuth-tellurium.

18. An apparatus for controlling the opening and closing of a channel for a liquid according to claim 16, wherein said P-type semiconductor is made from bismuth-antimony.

19. An apparatus for controlling the opening and closing of a channel for a liquid according to claim 3, wherein an inner surface of said channel for said liquid is covered with a film of PTEF or of gold.

20. An apparatus for controlling the opening and closing of a channel for a liquid according to claim 4, wherein said channel for said liquid is made from a good heat conductivity type of tubular member which is securely fitted into a bore formed in said heat transmitting means.

21. An apparatus for controlling the opening and closing of a channel for a liquid according to claim 3, wherein said heat transmitting means is made of one of aluminum and aluminum alloy.

22. An apparatus for controlling the opening and closing of a channel for a liquid according to claim 3, wherein said heat transmitting means is made of one of copper and copper alloy.

23. An apparatus for controlling the opening and closing of a channel for a liquid according to claim 3, wherein said heat transmitting means is made of a ceramic material.

24. An apparatus for controlling the opening and closing of channels for a liquid, comprising:
heat transmitting means of a good heat conductivity type through which a plurality of channels extend in the same direction;
at least one cooling and heating means having one heat absorbing and generating part secured to said heat transmitting means;
heat exchanger means secured to another part of the at least one cooling and heating means spaced from the one heat absorbing and generating part; and
controlling means for controlling said heat absorbing and generating part of said cooling and heating means to execute heat absorption or heat generation;
said apparatus being arranged such that said channels are closed first by causing said controlling means to control said heat absorbing and generating part of said cooling and heating means which is closer to said heat transmitting means to execute said heat absorption and then by cooling said heat transmitting means to solidify said liquid in said channels in said heat transmitting means, and such that said channels are opened first by causing said controlling means to control the same heat absorbing and generating said heat transmitting means to melt said liquid solidified in said channels in said heat transmitting means.

25. An apparatus for controlling the opening and closing of channels for a liquid according to claim 24, wherein said plurality of channels is arranged in a plurality of parallel rows which rows are arranged in vertical columns.

26. An apparatus for controlling the opening and closing of channels for a liquid according to claim 24, wherein said heat transmitting means is made from a single member.

27. An apparatus for controlling the opening and closing of channels for a liquid according to claim 24, wherein said heat transmitting means is made from a plurality of plate-shaped members in each of which said channels for said liquid are formed.

28. An apparatus for controlling the opening and closing of channels for a liquid according to claim 24, wherein said heat transmitting means is made from a plurality of plate-shaped members which are secured to each other in a stacked manner, said channels for said liquid being made from tubes which are secured by recesses formed in adjoining flat portions of said respective plate-shaped members.

29. An apparatus for controlling the opening and closing of channels for a liquid according to claim 26, wherein said channels for said liquid are each made from a good heat conductivity type of tubular member which is securely fitted into a bore formed in said heat transmitting means.

30. An apparatus for controlling the opening and closing of channels for a liquid according to claim 24, wherein said heat transmitting means is made of one of aluminum and aluminum alloy.

31. An apparatus for controlling the opening and closing of channels for a liquid according to claim 24, wherein said heat transmitting means is made of one of copper and copper alloy.

32. An apparatus for controlling the opening and closing of channels for a liquid according to claim 24, wherein said heat transmitting means is made of ceramics.

33. An apparatus for controlling the opening and closing of channels for a liquid according to claim 24, wherein said cooling and heating means is a heat pump.

34. An apparatus for controlling the opening and closing of channels for a liquid according to claim 24, wherein said cooling and generating means is a thermoelement.

35. An apparatus for controlling the opening and closing of channels for a liquid according to claim 34, wherein said thermoelement is made from a semiconductor device.

36. An apparatus for controlling the opening and closing of channels for a liquid according to claim 35, wherein semiconductors are electrically connected in series and in alternate sequence, each connecting point of said semiconductors being connected to said heat transmitting means and said heat exchanger means in parallel and in alternate sequence.

37. An apparatus for controlling the opening and closing of channels for a liquid according to claim 36, wherein said semiconductors are made from bismuth-tellurium.

38. An apparatus for controlling the opening and closing of channels for a liquid according to claim 36, wherein an N-type semiconductor is made from bismuth-antimony, while a P-type semiconductor is made from bismuth-tellurium.

39. An apparatus for controlling the opening and closing of channels for a liquid according to claim 23, wherein inner surfaces of said channels for said liquid are each covered with a film of PTEF or of gold.

40. An apparatus for controlling the opening and closing of a channel for a liquid, comprising:
heat transmitting means through which at least one branch channel extends, said branch channel branching from at least one main channel for said liquid;
at least one cooling and heating means having one heat absorbing and generating part secured to said heat transmitting means;
heat exchanger means secured to another part of said at least one cooling and heating means; and
controlling means for controlling said heat absorbing and generating part of said cooling and heating means to execute heat absorption or heat generation;
said apparatus being arranged such that said channels are closed first by causing said controlling means to control said heat absorbing and generating part of said cooling and heating means which is closer to said heat transmitting means to execute said heat absorption and then by cooling said heat transmitting means to solidify said liquid in said channels in said heat transmitting means, and such that said channels are opened first by causing said controlling means to control the same heat absorbing and generating part to execute said heat generation and then by heating said heat transmitting means to melt said liquid solidified in said channels in said heat transmitting means.

41. An apparatus for controlling the opening and closing of a channel for a liquid according to claim 40, wherein at least one branch channel which branches from each of a plurality of main channels is provided in a common heat transmitting means.

42. An apparatus for controlling the opening and closing of a channel for a liquid, comprising:
a plurality of heat transmitting means through each of which at least one channel for said liquid extends;
at least one cooling and heating means having one heat absorbing and generating part secured to each of said heat transmitting means;
common heat exchanger means secured to another part of each of said at least one cooling means; and
cooling means for controlling said heat absorbing and generating part of said cooling and heating means to execute heat absorption or heat generation;
said apparatus being arranged such that said channel is closed first by causing said controlling means to control said heat absorbing and generating part of said cooling and heating means which is closer to said heat transmitting means to execute said heat absorption and then by cooling said heat transmitting means to solidify said liquid in said channel in said heat transmitting means, and such that said channel is opened first by causing said controlling means to control the same heat absorbing and generating part to execute said heat generation and then by heating said heat transmitting means to melt said liquid solidified in said channel in said heat transmitting means.

43. An apparatus for controlling the opening and closing of a channel for a liquid according to claim 42, wherein said common heat exchanger means is formed from a tubular path which forms one of a heat pipe and a cooling-medium flow channel.

44. An apparatus for controlling the opening and closing of a channel for a liquid according to claim 42, wherein said common heat exchanger means is made up of fins.

45. An apparatus for controlling the opening and closing of a channel for a liquid, comprising:
a plurality of heat transmitting means through each of which a branch channel branching from said channel for said liquid extends;
cooling and heating means having one heat absorbing and generating part secured to at least one of said heat transmitting means and another heat absorbing and generating part secured to the remaining heat transmitting means; and
controlling means for controlling said heat absorbing and generating part of said cooling and heating means to execute heat absorption or heat generation;
said apparatus being arranged such that said channel is closed first by causing said controlling means to control said heat absorbing and generating part of said cooling and heating means which is closer to said heat transmitting means to execute said heat absorption and then by cooling said heat transmitting means to solidify said liquid in said branch channel in said heat transmitting means, said channel being simultaneously opened first by causing said controlling means to control the other heat absorbing and generating part to execute said heat generation and then by heating said other heat transmitting means to melt said liquid solidified in said channel in said heat transmitting means.

* * * * *